Nov. 5, 1946.   W. G. SCHINSKE   2,410,527
AUTO CHARGER
Filed July 17, 1944
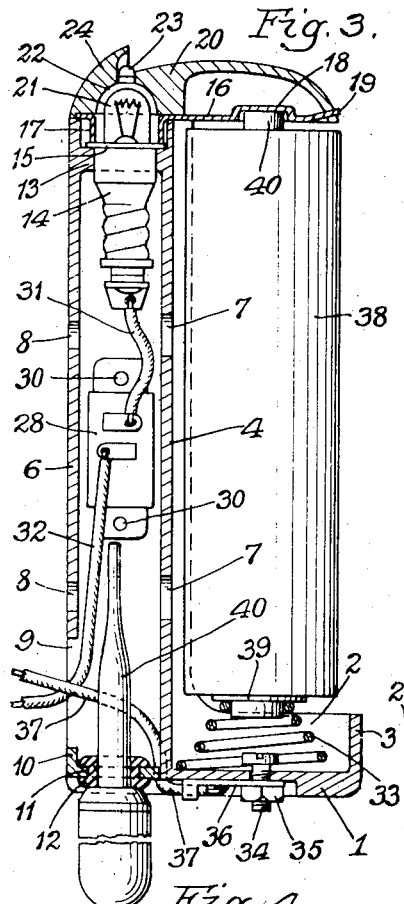
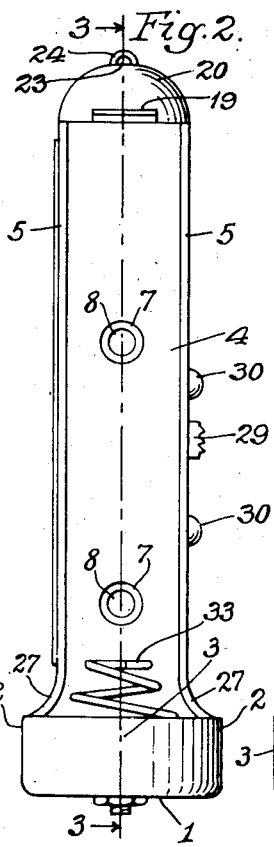
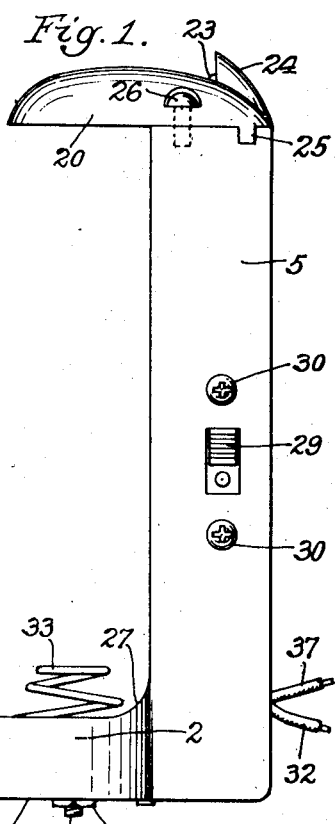
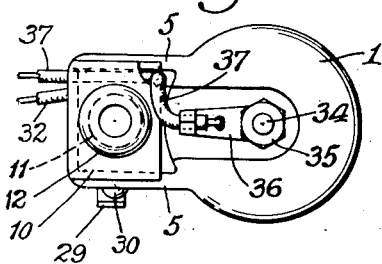
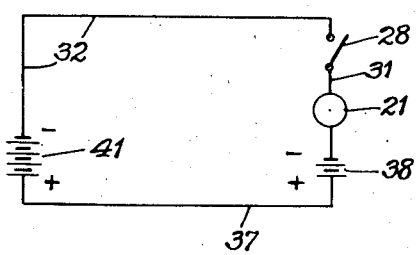
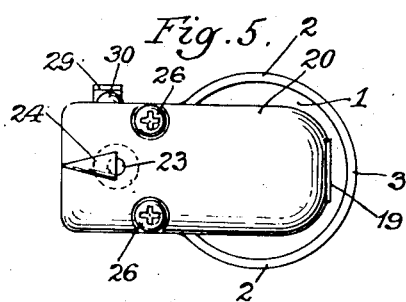
Inventor
William G. Schinske
by Parker & Carter
Attorneys.

Patented Nov. 5, 1946

2,410,527

UNITED STATES PATENT OFFICE 2,410,527

AUTO CHARGER

William G. Schinske, Sycamore, Ill., assignor, by mesne assignments, to Ideal Industries, Inc., Sycamore, Ill., a corporation of Delaware Application July 17, 1944, Serial No. 545,378

2 Claims. (Cl. 320—2)

This invention relates to a battery charger and in the form shown is particularly applicable to the charging of a small wet storage battery.

One object is to provide a charger which can be positioned at a suitable point on an automobile and connected to the automobile battery.

Another object is to provide such a charger so arranged that a small storage cell suitable for use in a handlight, such as a flashlight, may be readily charged from the automobile battery.

A still further object is to provide an ornamental compact battery charger which may be permanently positioned on the instrument board of an automobile vehicle and may be readily used to charge a relatively small storage battery from the main automobile source of current.

Other objects will appear from time to time in the course of the specification and claims.

The invention is illustrated more or less diagrammatically in the accompanying drawing wherein:

Figure 1 is a side elevation of the charger;

Figure 2 is a front elevation of the charger of Figure 1;

Figure 3 is a vertical sectional view taken at the line 3—3 of Figure 2;

Figure 4 is a bottom plan view of the charger;

Figure 5 is a top plan view; and

Figure 6 is a schematic diagram of one suitable wiring circuit.

Like parts are indicated by like symbols throughout the specification and drawing.

While the charger housing may be formed of any desirable material and may be formed as a unitary member or in several parts, it is convenient to form it of some material which may be readily molded such as one of the many presently available plastic materials. Such materials may be molded readily and are relatively light and are electrically insulating. For convenience of manufacture the device may be made in more than one part. As shown it is cast in essentially two parts, a main part and a top or cover part.

In the form shown the main casing comprises an elongated bottom 1 having raised side portions 2 and an integral raised end portion 3. These parts form in effect closures for one of the battery contacts. Preferably integrally with the bottom 1 is an upstanding portion 4 which is also preferably integral with upward extensions 5 of the side walls 2. The side portions 5 extend both front and rear of the portion 4 as shown particularly in Figure 3 and may be joined at their rear ends by an integral rear wall 6. Perforations 7, 7 may be formed in the member 4 to permit screws, bolts or other fastening members to pass through them and registering perforations 8, 8 may be formed in the wall 6 for the same purpose. The rear wall member 6 stops short of the bottom of the housing and an open space 9 remains below it. This is for convenience in assembly and may be partially closed by a member 10 which is fixed in place preferably after the necessary parts of the assembly have been put in place in the more or less tubular section formed by the front wall 4, the side walls 5 and the rear wall 6. The member 10 is provided with a perforation 11 in which a grommet 12 may be positioned.

Within the tubular housing section a seat portion 13 may be formed. This seat portion is formed of a flange which is preferably integral with the wall portions surrounding it and is of suitable size and shape to form a seat for a lamp socket 14. This socket includes or is in contact with a laterally extending conductive flange 15. An electrically conductive plate 16 is positioned over the upper end of the tubular housing portion and preferably includes a downwardly depending flange 17 which is in electrical contact with the member 15. A socket portion or depression 18 may be formed in the plate 16 and serves as a seat for one of the battery contacts during charging. The outer end of the plate 16 is preferably upwardly bent as at 19.

The housing is completed by a cover member 20 which is of elongated shape as shown particularly in Figures 1, 3 and 5. Its upper surface is preferably curved and may be given a more or less ornamental appearance. It serves as a support for the battery contact plate 16 and also is an enclosure for the electric light bulb 21 which is seated in the socket 14. That portion of the member 20 which is positioned above the bulb 21 is shaped to provide a rounded cavity 22 which more or less conforms to the shape of the bulb. At the upper portion of the cavity 22 a lens 23 seated in a suitable opening so that the light from the bulb 21 passes through this opening and through the lens 23. A protective and reflective portion 24 is formed in the member 20 to one side and partially overlies the lens 23. It serves to protect the lens and to some degree reflect light from the lens and it may be given a reflective surface if desired. As shown particularly in Figure 1 the side walls 5 of the main housing are notched to receive a projection 25 in the member 20 and by this means the member 20 interlocks with the main housing portion. The member 20 may also be secured to the housing portion by screws 26 or otherwise.

It is to be understood that the invention is not limited to any particular shape of housing. For example the housing formed by the members 4, 5 and 6 may be of rectangular cross section or of rounded cross section. As shown the side portions 5 which are preferably integral with the side portions 2 are joined to them by curved portions or fillets 27 but the parts might be otherwise shaped.

A switch is positioned within the housing and is designated generally by the numeral 28; an operating lever 29 extends through one of the walls 5 and the switch itself may be fixed in place by screws 30, 30 or otherwise. A conductor 31 extends from one pole of the switch to the bulb socket 14. A conductor 32 extends from the other pole of the switch to a source of current which may be the main storage battery of the automotive vehicle on which the device is mounted.

A spring 33 is held in place by a screw 34 and a nut 35. The screw and nut engage a terminal plate 36 which is connected to a conductor 37 which is itself connected to a source of current such as the main storage battery of the vehicle. As shown particularly in Figures 4 and 5, the bottom plate 1 of the housing may be of generally rounded cross section, and correspondingly the wall portions 2 and 3 will at that portion of the housing be of generally rounded plane as shown in Figure 5.

In Figure 3 one form of a battery which may be charged by the charger of this invention is illustrated. As shown therein, it comprises a rounded, elongated housing 38 from one end of which extends a contact 39 which is adapted to contact the spring 33. From the other end of the battery extends a contact member 40 which is adapted, in charging, to contact the depression or socket 18 of the plate 16.

While the charger may be mounted on an automobile, it may be mounted on a ship, boat, airplane or any vehicle which is equipped with a battery suitable for charging the small battery.

The charger may be mounted at any convenient location on or in said vehicle.

If desired, a dropper 40 may be removably positioned in the grommet 12, for use in adding water to the battery 38, when needed.

Although I have shown an operative form of my invention, it will be recognized that many changes in the form, shape and arrangement of parts can be made without departing from the spirit of the invention, and my showing is therefore to be taken as, in a sense, diagrammatic. The switch may, if desired, have a white button or other marker to show the user when the switch is closed. The member 39 need not extend below the bottom of the battery 38. The battery may be long enough to extend below the upper margin of the member 3 when the battery is in the charging position.

The use and operation of my invention are as follows:

In general the device of this invention will be mounted on some convenient place on an automotive vehicle, for instance on the instrument board. It is small and relatively attractive in appearance and will not disfigure the board. It is fastened in place by screws or bolts or other members passing through the openings 7 and 8 and it is connected to a source of current which may conveniently be the storage battery of the vehicle. The height of the charger is such that it conveniently fits a standard storage cell.

When such a cell is to be charged, it is filled with electrolyte and is put in position so that one pole or contact is in contact with the screw 34 or the spring 33 and so that the other pole or contact is in contact with the plate 16 and is preferably seated in the socket or depression 18. The switch lever 29 is then moved to the "on" position and if the circuit is in proper order and charging is taking place the bulb 21 will be lighted. The purpose of the bulb is, of course, to give an indication that charging is going on. When the cell has been charged to a suitable degree, it is removed and the device will remain inactive until used again. The bulb also gives the correct resistance for the battery to be charged at the correct rate. With different sources of charging supply, a different bulb might be used. When the cell has been charged, the switch may be turned off and the battery may remain in the charger, the latter acting then as a holder.

I claim:

1. A storage battery charger comprising a hollow supporting standard adapted to serve as a housing, a light bulb socket and a controlling switch therefor mounted within the housing, cover means for said housing provided with an opening through which light from a bulb in said socket may be viewed from the exterior of the standard, an upstanding flange carried by the cover means and overhanging said lens, said flange being provided with a forwardly directed reflecting surface for directing light from said bulb forwardly over said cover means, a pair of forwardly projecting arms extending from said housing in generally parallel relation, one of each of said arms being disposed adjacent to either end of the housing and arranged to support a battery therebetween in generally parallel relation to said housing, a battery contact carried by each arm, at least one of said contacts being resilient, means electrically connecting one of said contacts with one pole of said bulb socket, and electrically connecting the other pole of the bulb socket with one pole of said switch and plural conductive means extending within said housing from an external point and electrically connected respectively to the other battery contact and to the other pole of the switch to thereby connect the charger to an external source of potential.

2. A storage battery charger comprising a hollow supporting standard adapted to serve as a housing, a light bulb socket and a controlling switch therefor mounted within the housing, cover means for said housing provided with an opening through which light from a bulb in said socket may be viewed from the exterior of the standard, a lens within said opening, an upstanding flange carried by the cover means and overhanging said lens, said flange being provided with a forwardly directed reflecting surface for directing light from said bulb forwardly over said cover means, a pair of forwardly projecting arms extending from said housing in generally parallel relation, one of each of said arms being disposed adjacent to either end of the housing and arranged to support a battery therebetween in generally parallel relation to said housing, a battery contact carried by each arm, at least one of said contacts being resilient, means electrically connecting one of said contacts with one pole of said bulb socket, and electrically connecting the other pole of the bulb socket with one pole of said switch and plural conductive means extending within said housing from an external point and electrically connected respectively to the other battery contact and to the other pole of the switch to thereby connect the charger to an external source of potential.

WILLIAM G. SCHINSKE.